Figure 1:
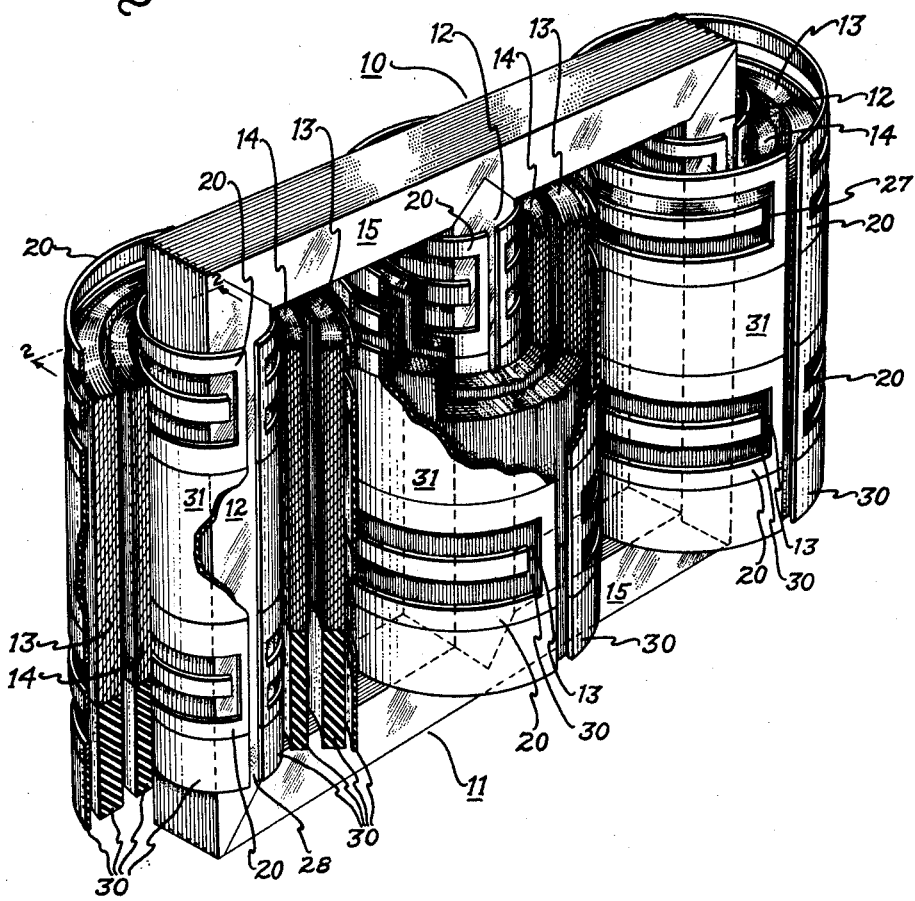

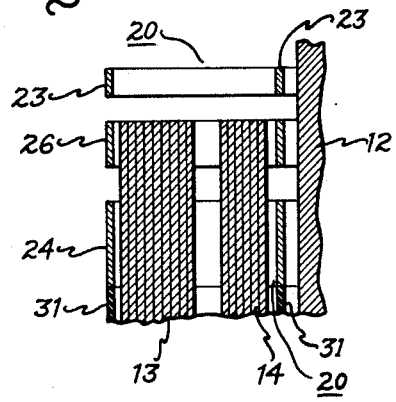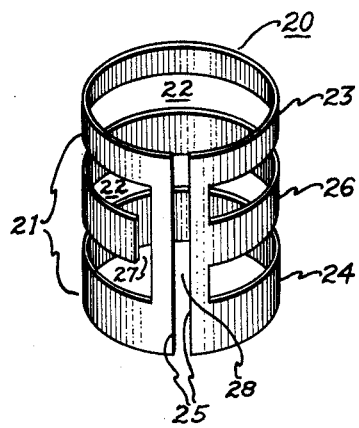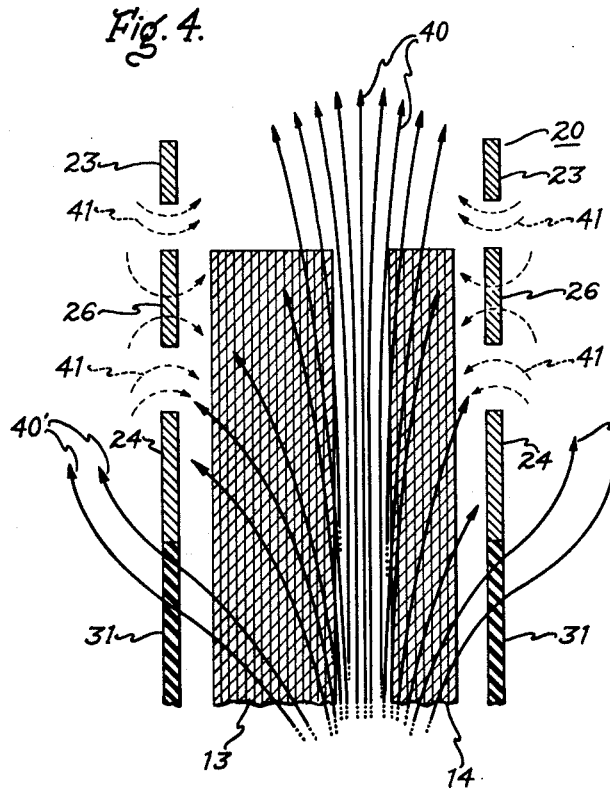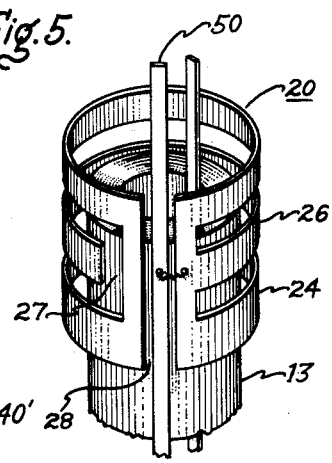
Inventors,
William A. Keen, Jr.,
Anthony J. Damasca,
Leonard Rabins,
by Gilbert P. Tarleton
Their Attorney.

United States Patent Office 3,142,029
Patented July 21, 1964

3,142,029
SHIELDING OF FOIL WOUND ELECTRICAL
APPARATUS
William A. Keen, Jr., Cheshire, and Anthony J. Damasca and Leonard Rabins, Pittsfield, Mass., assignors to General Electric Company, a corporation of New York
Filed Aug. 22, 1960, Ser. No. 51,222
5 Claims. (Cl. 336—84)

This invention relates to electrical apparatus, and more in particular to means for reducing current concentrations and resulting high temperature localizations in electrical foil windings.

In the past the use of foil windings for electrical induction apparatus, such as transformers and the like, has been limited to relatively low kva. applications because uneven current distribution in the foil windings has resulted in hot-spot temperatures that exceeded permissible values. Uneven current distribution in foil windings is caused by fringing of the magnetic leakage flux at the edges of the windings. The fringing of the flux lines at the edges of the winding causes the flux to cut across more of the foil sheets than at the central portion of the winding where the lines of flux are relatively straight. Consequently, a greater current density occurs at the edges of the winding because the induced current is closely related to the amount of flux that cuts across the conductor material from which the winding is made.

We have discovered that the tendency of magnetic flux lines to fringe at the edges of an electrical foil winding can be reduced by subjecting the flux to a counter magnetomotive force that causes it to move in a straighter path. This reduces the amount of flux which cuts across the winding edges and thus causes the relative current density at the edges of a foil winding to be closer to that at the interior portion of the winding. The resulting overall increase in uniformity of current density reduces the heat generated at the edges of the winding and allows such windings to be employed in higher kva. applications. Thus, by practicing our invention, foil windings can be employed in a larger number of instances in higher powered electrical induction apparatus.

Accordingly, it is an object of our invention to provide an improved electrical apparatus.

Another object of our invention is to provide an improved electrical foil winding.

A further object of our invention is to provide means for shielding an electrical foil winding.

A still further object of our invention is to provide an improved method of reducing current concentrations in electrical foil windings.

Other objects and advantages of our invention will become apparent from an examination of the following specification, drawings, and claims, and the scope of the invention will be pointed out in the appended claims.

According to one aspect of our invention, the distribution of current in an electrical foil winding can be made more uniform by subjecting magnetic flux passing through the winding to magnetomotive force which tends to straighten the path the flux travels. In a favored embodiment of our invention, current concentrations at an edge of an electrical foil winding are reduced by surrounding the winding with a sheet of electrical conducting material. An electric current is induced in this sheet which in turn produces a magnetomotive force that opposes the fringing flux.

In the drawings:

FIGURE 1 is a perspective partially cross-sectional view of an embodiment of electrical apparatus in accord with the teachings of our invention, FIGURE 2 is a cross-sectional partially broken away view taken along the lines 2—2 in FIG. 1, FIGURE 3 is a perspective view of an electrical shield in accord with the teachings of our invention, FIGURE 4 is a cross-sectional view of a pair of windings and shields in accord with the teachings of our invention, with the magnetic flux acting on the winding schematically illustrated by arrows, FIGURE 5 is a perspective partially broken away view of an electrical winding and shield, showing a method of connecting the shield.

Referring now to the drawing, and more in particular to FIGURE 1, an electrical transformer 10 in accord with our invention is schematically illustrated. The transformer 10 comprises a magnetic induction core 11 having yokes 15 and legs 12 which are surrounded by high voltage windings 13 and low voltage windings 14. The windings are made from continuous sheets of electrical conducting foil material, such as aluminum or copper foil, which are spirally wound around the respective core legs 12. According to a favored embodiment of our invention, the windings are provided with means, such as the shields 20, that produce a magnetomotive force which reduces fringing of the magnetic flux at the edges of the windings. From FIGURE 2 it can be seen that the windings 13 and 14 may be disposed between two shields 20, one of which surrounds the core 12 and is itself surrounded by the winding 14, and the other shields surrounding the windings 13. It will be apparent from the description that follows that additional shields could be placed at other locations, as for example between the windings 13 and 14, without departing from the teachings of our invention.

A preferred embodiment of our shield structure is more clearly illustrated in FIGURE 3. The shields 20 may be formed from substantially rectangular sheets of electrical conducting material which have been bent to a substantially cylindrical shape that enables them to surround the windings. The ends of the shields are separated by a narrow gap 28 that prevents them from becoming short-circuited turns. Each shield 20 comprises a closed outer peripheral loop 21 of conducting material which defines an open central portion 22. The peripheral loop 21 may comprise a first edge portion 23, a second edge portion 24, and end portions 25. It is thus apparent that if the shield 20 were laid out as a developed surface, the portions 23, 24, and 25 would define a closed substantially rectangular peripheral loop at its edges. An intermediate portion 26 of the shield is connected to the peripheral edge or loop 21 and extends into the open portion 22. It should be noted that the second edge portion 24 is wider in its axial dimension than the intermediate portion 26, which in turn is wider than the first edge portion 23. The reason for this will be given in a paragraph that follows.

The windings 13 and 14 and the shields 20 may be supported by blocks of insulating material 30 in the conventional manner. Also the shields 20 at the upper end of the windings may be supported on the shields at the lower end of the windings by spacer blocks 31 of the insulating material. The shields and high and low voltage windings of the transformer 10 may be separated by conventional spacers of insulating material (not illustrated) to provide passages for flow of an insulating and cooling fluid.

Referring now to FIGURE 4, the effect produced by the shields 20 is illustrated by the arrows 40, 40', and 41, which schematically indicate the flux of the magnetic field passing through the winding and shields. The arrows 40 and 40' represent the main leakage flux produced by the load current in the windings 13 and 14. The dotted arrows 41 represent the flux caused by the current induced in the shields 20. It should be noted that the flux 40 is relatively straight at the central portion of the windings 13 and 14, but tends to fringe radially outwardly and inwardly at the end of the windings. Consequently, more flux lines cut across the layers of the conducting foil material at the ends of the windings and thus produce a higher concentration of current at the ends of the windings than at the center portion thereof. If the lines of flux were perfectly straight and parallel to the axial sides of the layers of foil conductor material from which the windings are made, the distribution of current through the winding would be uniform. Thus, any phenomena which tends to straighten the path travelled by the lines of flux to approach this condition tends to make the distribution of current in the winding more uniform. The shields 20 are in the magnetic field of this leakage flux, and are thus linked by the lines of flux. Consequently, a current is induced in each shield 20, and this current itself produces a magnetic field represented by the arrows 41. The shield produced flux 41 is counter to the radial component of the flux 40 and thus tends to straighten the path travelled by the flux 40 to cause it to flow in a more nearly axial path. This reduces the fringing of the flux 40 at the ends of the winding and thus produces a more uniform concentration of current in the winding. Also, some of the flux 40 will try to escape the confining effect of the shields 20, and consequently some of the lines of flux 40' tend to fringe radially outwardly between the shields 20 and thus cut across more conductor foil layers near the central portion of the windings and induce more of a current in that portion. This also tends to increase the concentration of current near the central portion of the windings and thus makes the overall current distribution more uniform.

It has been found by experimentation that a triple element shield, in accord with the preferred embodiment of our invention, produces better results than a shield made from a whole piece of metal of roughly the same dimensions. The explanation for this is believed to be that in a whole metal shield the concentration of flux produced in the shield by the induced current is spread over a large area and thus cannot be concentrated opposite the edge of the winding where it will have the greatest effect. On the other hand, in our preferred shield embodiment, the intermediate portion 26 is located directly opposite the edge of the winding with the edge of the portion 26 being substantially level with the terminal edge of the winding, and has a relatively high current concentration therein. This increases the density of the counter flux 41 at the edge of the winding because the flux density is proportional to current density. It has also been found by experimentation that a triple element shield having its intermediate portion 26 connected at one end only so as to form a gap 27 at the unconnected end produces the best results.

The first edge portion 23 of the shield is relatively small in axial height in order that the length of the core leg, commonly called the window height, can be kept to a minimum. The second edge portion 24 of the shield 20 may be made as long as possible in the axial direction in order to increase the amount of current induced in the shield and thus the strength of the counter field it produces. This dimension is empirically arrived at and can be determined by trying various lengths until a point of diminishing returns is reached. The intermediate portion 26 of the shield is made to an axial dimension that will concentrate the flux at the edge of the shield where it will produce the most useful result. The extent of this axial dimension is also empirically arrived at, but is generally a dimension intermediate that of the first and second portions 23 and 24.

In FIGURE 5 the shield 20 is shown to be electrically connected to a lead 50 which is connected to the outer turn of a high voltage winding 13. This causes the shield 20 to be at the same electrical potential as the winding, and thus the shield increases the electrical insulation withstand strength of the winding by reducing the voltage gradient at the edge of the coil. Thus when shields are also employed as the means for reducing the fringing of flux, the shields can be used to serve two functions.

It will be apparent to those skilled in the art that it is virtually impossible to measure the current distribution in a foil winding by direct methods. Consequently, an electrolytic analog tank was constructed so as to be analogous to foil windings with no shield. Tests were run to determine the distribution of current in such windings. The tank was then modified so as to be analogous to foil windings shielded by a shield having the structure illustrated in the drawing. Tests were run on this tank analog, and the results showed marked improvement in current distribution as a result of the addition of shields. Temperature distribution tests were run on actual foil wound transformers, and these tests showed that a reduction in hot spot temperatures at the edge of the windings occurred as a result of the addition of a flux confining shield in accord with the teachings of our invention.

It has been shown that by subjecting a magnetic field that fringes at the edges of an electrical foil winding to a counter magnetic field, the current distribution in the winding can be improved, with a resulting lowering of hot spot temperatures. It will be appreciated by those skilled in the art that means other than the specific shield illustrated in the drawing could be employed to achieve this desirable result. For example, shield means with an alternating current directly applied to the shield, instead of a flux induced current, could be employed to produce a counter-magnetic field. Thus, a broader aspect of our invention is the method of obtaining a more uniform current distribution in an electrical foil winding by opposing the tendency of magnetic flux to fringe at the edges of the winding by subjecting the flux to a counter electrical force.

It will be understood, of course, that while the forms of the invention herein shown and described constitute preferred embodiments of the invention, it is not intended herein to illustrate all of the equivalent forms or ramifications thereof. It will also be understood that the words used are words of description rather than of limitation, and that various changes may be made without departing from the spirit or scope of the invention herein disclosed, and it is aimed in the appended claims to cover all such changes as fall within the true spirit and scope of the invention.

What we claim as new and desire to secure by Letters Patent of the United States is:

1. In combination, an electric foil winding and an electric shield for reducing current concentrations at an edge of said winding, said shield comprising a substantially rectangular sheet of electrical conducting material formed into a substantially cylindrical shape for encompassing said winding, there being a narrow gap separating the ends of said shield, said shield comprising a first edge portion, a second edge portion, and end portions connecting said first and second edge portions so as to define a closed outer peripheral loop portion, an intermediate portion integral at one end with an end portion, and said intermediate portion extending into said loop portion.

2. An electrical shield for reducing current concentrations at the edge of an electrical foil winding comprising a substantially rectangular sheet of electrical conducting material formed into a substantially cylindrical shape for encompassing said winding, there being a narrow gap separating the ends of said shield, said shield comprising a first edge portion, a second edge portion, and end portions connecting said first and second edge portions so as to define a closed outer peripheral loop portion, an intermediate portion integral at one end with and end portion, and said intermediate portion extending into said loop portion.

3. An electrical transformer comprising a core, a foil winding surrounding said core, and a shield adjacent an edge of said winding comprising a substantially rectangular sheet of electrical conducting material formed into a substantially cylindrical shape for encompasing said winding, there being a narrow gap separating the ends of said shield, said shield comprising a first edge portion, a second edge portion, and end portions connecting said first and second edge portions so as to define a closed outer peripheral loop portion, an intermerdiate portion integral at one end with an end portion, and said intermediate portion extending into said loop portion.

4. An electrical transformer comprising a core having a plurality of legs connected by yokes, a low voltage winding surrounding each of said legs, a high voltage winding surrounding each low voltage winding, each of said high and low voltage windings comprising a sheet of spirally wound electrical conducting foil material, shields at opposite ends of said low voltage windings between each low voltage winding and its associated core leg, shields surrounding the oppositee ends of each high voltage winding, said shields each being formed from a substantially rectangular sheet of electrical conducting material bent into a substantially cylindrical shape, there being a narrow gap separating the ends of each shield, each shield comprising a first edge portion, a second edge portion, and end portions connecting said first and second edge portions so as to define a closed outer peripheral loop portion, an intermediate portion integral at one end with an end portion and extending into said closed peripheral loop, an edge of the intermediate portion of each shield being axially in line with an end of the closest adjacent winding, and the shields at opposite ends of the respective being separated by blocks of insulating material.

5. An electrical transformer as defined in claim 4 in which each winding has a lead extending therefrom, and at least one of said shields is electrically connected to the lead from its associated winding.

References Cited in the file of this patent

UNITED STATES PATENTS

| | | |
|---|---|---|
| 1,717,347 | Camilli | June 11, 1929 |
| 2,608,089 | Raymond et al. | Aug. 26, 1952 |
| 2,608,610 | Thulin | Aug. 26, 1952 |
| 2,714,710 | Bradley | Aug. 2, 1955 |
| 2,738,425 | Heath et al. | Mar. 13, 1956 |

FOREIGN PATENTS

| | | |
|---|---|---|
| 468,973 | Germany | Nov. 27, 1928 |